April 30, 1968  L. H. REES  3,380,958
METHOD OF INCORPORATING CARBON BLACK AND OTHER
MATERIALS INTO ELASTOMERS
Filed Dec. 23, 1966  4 Sheets-Sheet 1

Inventor
Lancelot H. Rees
by
Attorney

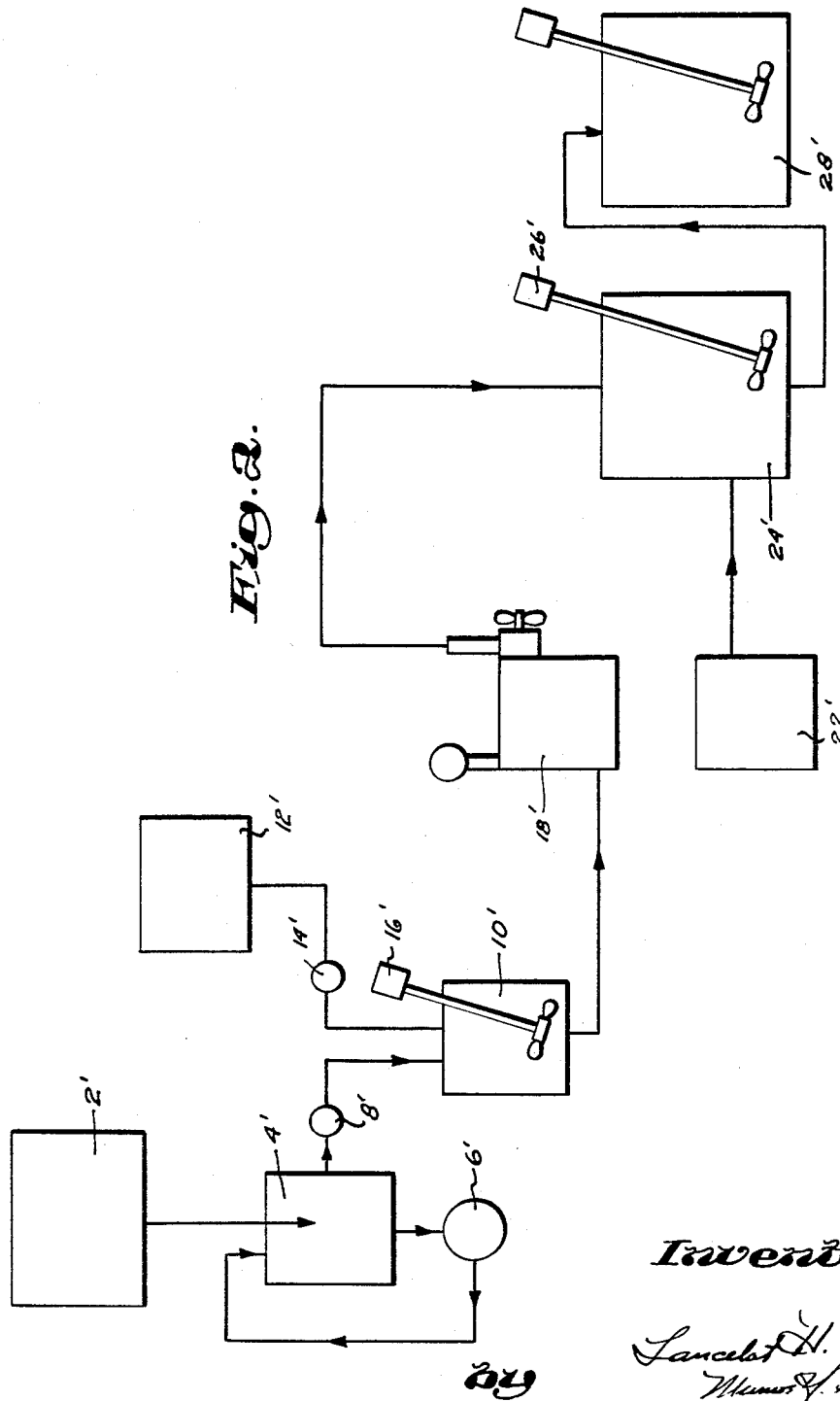

United States Patent Office 3,380,958
Patented Apr. 30, 1968

3,380,958
METHOD OF INCORPORATING CARBON BLACK AND OTHER MATERIALS INTO ELASTOMERS
Lancelot H. Rees, Westwood, Mass., assignor to Manton Gaulin Manufacturing Company, Inc., Everett, Mass., a corporation of Massachusetts
Continuation-in-part of application Ser. No. 248,461, Dec. 31, 1962. This application Dec. 23, 1966, Ser. No. 611,520
5 Claims. (Cl. 260—41.5)

ABSTRACT OF THE DISCLOSURE

The method of the invention involves the preparation of a premix in which two different classes of solids, i.e. carbon black particles and a rubber polymer in suitably proportioned quantities are dispersed in a highly uniform state of dispersion in a common liquid phase. The resulting system while in a highly uniform state of dispersion is conducted into a high pressure pumping apparatus which instantaneously subjects the mass to controlled pressures in a range of from 500 to 8000 p.s.i. and which releases the pressure through an orifice with the generation of intense cavitational field forces to cause the carbon black to pass into a very fine state of subdivision and to induce transition of the subdivided carbon particles from their water phase to the polymer phase in chemically bonded relationship.

---

This application is a continuation-in-part of application Ser. No. 248,461 filed Dec. 31, 1962, now abandoned.

The present invention, as well as the earlier application referred to relates to methods of reinforcing rubber and, more particularly, the invention is concerned with improved procedures for incorporating carbon blacks in rubber latices of either natural or synthetic type whereby the rubber polymer is preserved and the carbon blacks may be combined with the rubber polymer to provide significantly more effective rubber reinforcement.

Carbon blacks as generally referred to may include a group of submicron size pigments consisting of essentially pure carbon and produced commercially in such forms as channel black, furnace black, acetylene black, thermal black and others. These commercial carbon blacks occur in particle sizes ranging from about 10 to 500 milli-microns and it is well known that in using carbon blacks as a reinforcing agent in natural and synthetic rubber the most important variable affecting reinforcement is particle size with reinforcing properties increasing as particle size decreases.

It is also well known to those skilled in the art that carbon particles have a strong tendency to form aggregates and this tendency increases as subdivision is extended. The carbon aggregates are held together with varying degrees of bond strength depending upon the fuel from which they originate and the type of production process employed. It is also known that excessive mechanical working may result in excessive polymer degradation to a point where rubber reinforcement decreases undesirably.

Because of these limiting factors in both the carbon and rubber polymer difficulty is present in maximizing rubber reinforcement especially when attempting to combine carbon particles in an aqueous dispersion with solids in an aqueous latex dispersion.

In conventional mixing of carbon black with rubber to provide masterbatches having superior strength and abrasion resistance such as is required for tire treads or insulation purposes, best results are obtained by using carbon black in a dry state worked with a Banbury mixer. Less satisfactory results are obtained when an aqueous carbon black dispersion and latex are mixed although the rubber is used for these purposes and lower costs are realized.

Various procedures for using aqueous carbon black dispersions have been proposed in the art as disclosed, for example, in Sutherland Patent 3,055,856—Hull Patent 3,085,988 and Braendle Patent 2,769,795 and others. However, up until the present time aqueous carbon black dispersons have not been successfully used so far as I am aware to provide a product of tensile strength and abrasion resistance equal to that obtainable with dry masterbatching using a Banbury mixer or a rubber roll machine.

It is a chief object of the present invention, therefore, to improve methods of incorporating aqueous carbon black dispersions with latices and other elastomers and to devise a technique for producing masterbatches with latex and aqueous carbon black dispersions whose strength and abrasion resistance are of substantially improved character comparable with the strength and abrasion resistance obtained by dry masterbatching.

Another object of the invention is to devise a method of mixing an aqueous carbon black dispersion with latex in a more intimately incorporated relationship to obtain a chemical bonding between extremely finely divided solids of latices and carbon particles in a significant degree not heretofore accomplished in the art.

Another important objective is to provide a method of pressurizing carbon particles and elastomer constituents in which a state of subdivision is realized at which a unique absorption of carbon by the elastomer is caused to take place.

A further object of the invention is to provide an improved method of introducing coagulating and creaming agents to carbon black and latex mixtures. Still another object is to provide improved methods of controlling the degree and character of coagulation operations in producing a rubber crumb either with or without extenders, accelerators, fillers, vulcanizers and the like.

The nature of the invention and its other objects and novel features will be more fully understood and appreciated from the following description of preferred embodiments selected for purposes of illustration and shown in the accompanying drawings, in which:

FIGURE 2 is a diagrammatic view illustrating another form of the invention and particularly indicating the use of a brine for coagulating purposes;

Figure 6:
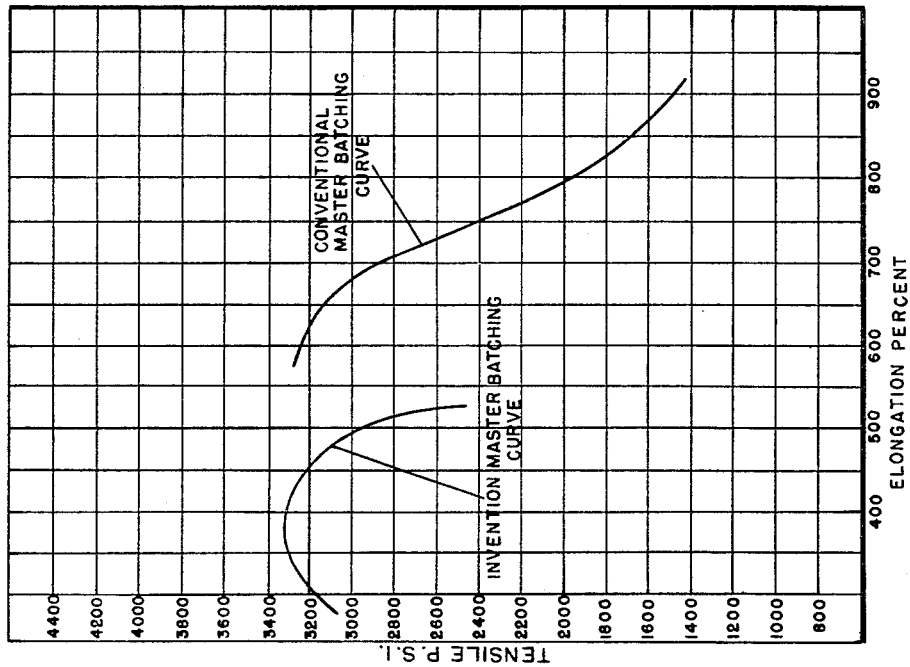
Figure 5:
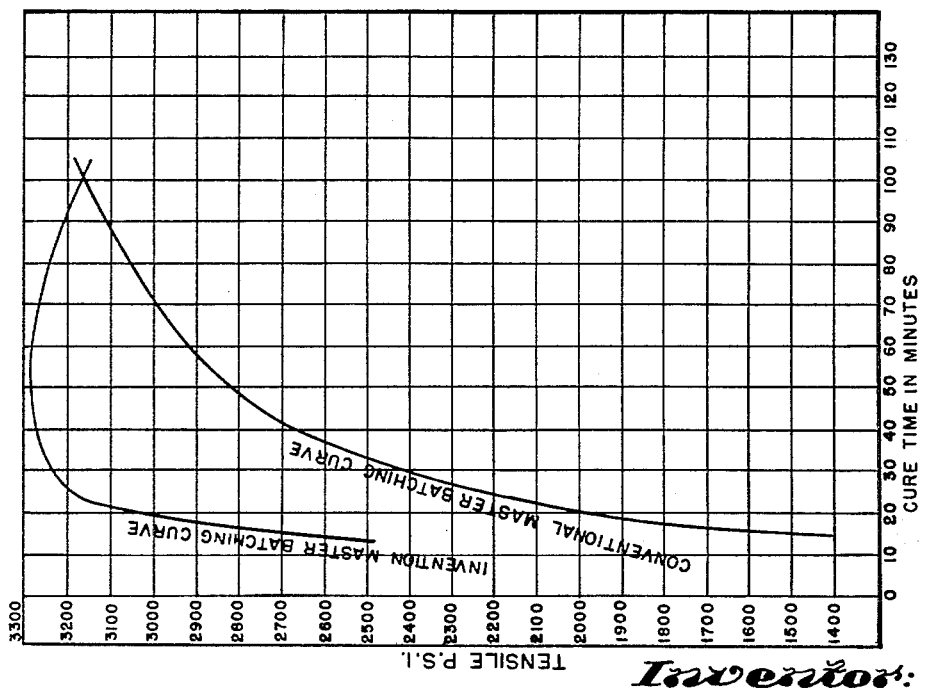

FIGURE 5 is a diagrammatic view showing a curve of tensile strength values plotted against cure time to illustrate improved properties of rubber products from masterbatching in accordance with the invention; and FIGURE 6 is another diagrammatic view illustrating a curve of tensile strength values plotted against elongation of samples produced by dry masterbatching in comparison with aqueous carbon black masterbatching in accordance with the invention.

From a consideration of the foregoing objectives and an examination and study of the conditions out of which they arise, I have conceived of a novel carbon dispersion technique based on the idea of instantaneously separating carbon black particles into an extremely finely divided state and simultaneously incorporating the carbon particles, while passing through this change of state, with a latex dispersion at a point at which the latex is also caused to undergo rapid transitional changes at exceedingly high energy levels whereby chemical bonding is induced.

I have discovered that this concept may be embodied in one practical form by subjecting a pre-mixed aqueous carbon black and latex liquid to extremely high levels of energy obtained by pressurizing the mixture at very high pressure intensities and then instantaneously releasing pressure through a controlled orifice.

I find that by carrying out this pressurizing operation at a sufficiently high range of pressures and by generating an intense cavitational field at the orifice, a point is reached at which the latex undergoes momentary changes in form or composition and simultaneously the carbon particles are subdivided to a pronounced extent. As this occurs the exceedingly fine particles of carbon become uniformly distributed throughout all portions of the latex and chemical bonding takes place with carbon particles being combined with the latex in a manner not heretofore realized in the art of masterbatching. These changes are evidenced in the resultant rubber product by change in physical properties such as solubility, tensile strength, abrasion resistance and ability to resist release or transfer of carbon when brought into contact with other surfaces.

In subjecting the carbon black and latex mixture to suitably high energy levels and generating intense cavitational forces in accordance with the invention method, I find that pressures of from in the neighborhood of 500 p.s.i. up to 8000 p.s.i. may be employed. At these pressures the latex and carbon particles move at very high velocities and the total time required to disperse the carbon black and incorporate it into the latex at the resulting energy levels indicated may be as little as one 100 thousandths of a second.

I have further found that chemical bonding of carbon particles to latex particles may be caused to take place in varying degrees and in a controlled manner. This may, I find, be accomplished by controlling the pressures employed in accordance with several important variables in the mix including (a) the type of latex particles dealt with (b) the size and composition of the carbon particles being combined and (c) the proportionate amounts of carbon particles and latex solids which are processed. Specifically pressure may be controlled or regulated in accordance with variation in molecular weight of the polymer use in a mix, or in accordance with variation in mean surface area per unit weight of carbon used or in accordance with changes in proportions of carbon and polymer combined.

I have further discovered that by employing controlled high energy level processing of the aqueous carbon black and latex, and by regulating the composition and pH of the carbon black, I may obtain important advantages and I may carry out improved coagulation of the resultant mix.

For example, in a system where it is desirable not to have coagulum during the dispersion step, I may desire to use a pH range of between 7–10 for the carbon black. However, in instances where the particular stability of the latex or other polymer permits, or where I may desire to obtain a degree of coagulum during the dispersion step, I may operate in a pH range of from 3 to 7.

I further find that coagulation may be accelerated by placing a second restricted orifice in series with the first orifice and introducing at high pressure a creaming or coagulating agent such as brine at the second orifice. In this way I may continuously and instantaneously cream and coagulate the latex carbon black mixture in a highly advantageous manner. Regulating pressure at the second orifice may also, I find, not only accelerate coagulation, but may further operate to control the size and extent of coagulation of the latex crumb formed.

Figure 1:
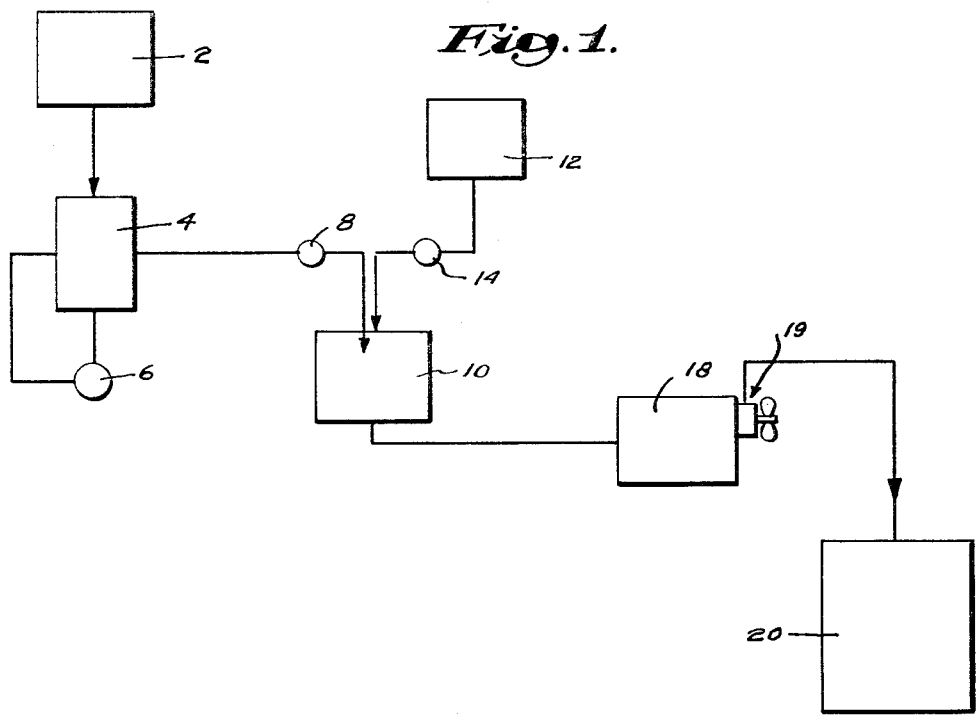
FIGURE 1 is a diagrammatic view illustrating one desirable form of the method of the invention.

Considering these steps in greater detail, FIGURE 1 illustrates diagrammatically one desirable form of the method of the invention. As noted therein, a suitable carbon black such as, for example, a furnace black whose pH is controlled as noted above is mixed with water in a receptacle 2, delivered to a tank 4, and circulated through a colloid mill 6. Measured quantities of the aqueous carbon black are conducted through a metering device 8 and then into a mixing tank 10. Into tank 10 another measured quantity of latex is furnished from a supply container 12 through a second meter 14. The mixture of aqueous carbon black and latex is subjected to agitation, for example, as by means of a mixing device as shown at 16' of FIG. 2.

In accordance with the invention method, the fluid mixture thus prepared is drawn into a high pressure pumping mechanism 18 and instantaneously subjected to very high pressures in a confined space. Thereafter pressurized fluid material is forced through a restricted orifice 19 in the presence of intense cavitational forces which are developed by exerting controlled pressures in the range of from 500 p.s.i. to 8000 p.s.i. Material from the orifice 19 passes into a coagulating and washing tank 20.

As illustrative of a specific processing operation using definite quantities of carbon black and rubber polymer the following example is cited.

EXAMPLE A

Step 1.—A slurry of particles of furnace black and water was prepared by mixing together 9.1 pounds of water occurring in a temperature range of from 60° F. to 80° F. and 9 pounds of a furnace black sold under the tradename Vulcan 3 and commercially produced by the Cabot Company of Boston, Mass. Vulcan 3 is conventionally used in dry masterbatching and is a furnace black type specified to have an average particle diameter of approximately 29 millimicrons.

Step 2.—The resulting slurry was thoroughly mixed by a standard propeller agitator device capable of producing a uniform distribution of the carbon particles in water.

Step 3.—This mixture was then passed through a colloid mill of the type known as a Manton Gaulin Model 2F Two-Stage Colloid Mill, with a gap setting between the rotor and stator being set at .010 inch. This model 2F colloid mill is manufactured and sold by the Manton Gaulin Manufacturing Company of Everett, Mass. A period of time of approximately 4.5 minutes was required to process the mixture specified.

Step 4.—The premixed carbon black slurry was then discharged from the colloid mill directly into a mixing tank to which was simultaneously added a quantity of latex consisting of 10 pounds of Copolymer 1500 manufactured by Polymer Corporation of Baton Rouge, La. The Copolymer 1500 consisted of an aqueous dispersion of synthetic latex particles having a water-like consistency and containing approximately 18 percent solids. The aqueous dispersion of latex particles contained a small quantity of a dispersing agent in the form of a soap material such as a stearate which functioned to prevent agglomeration of carbon particles and provide a stable dispersion.

Step 5.—The dispersion of carbon black and latex thus stabilized was then conducted into a high pressure pumping apparatus and pressurized in a controlled high energy pressure range by subjecting the mass to a pressure of approximately 6000 p.s.i. and instantaneously exposing constituent particles of carbon and polymer to intense cavitational forces as the mass is discharged through an orifice.

Step 6.—The discharged product was then led into a 1.0 percent solution of sulphuric acid to produce a coagulated crumb. The resulting crumb was washed and dried in accordance with standard masterbatching procedures to produce a final masterbatch crumb product.

The masterbatch crumb prepared in the manner described above when compared with conventional masterbatch crumb showed distinctive new properties. It is known that a rubber polymer may be mechanically worked to a point of excessive polymer degradation at which point reinforcement by carbon black begins to decrease rather than increasing further. In the invention crumb product it was found that there had been induced in the latex solids a change in form which approached but did not exceed a point of excessive polymer degradation. This was evidenced by increase in tensile strength in rubber samples made from the crumb as hereinafter disclosed.

It was also found that carbon black particles were caused to pass into a state of further subdivision and instantaneously exposed to intense cavitational forces which operate to induce a transition of the carbon particles from their water phase to the latex solid phase with chemical bonding taking place in a significant degree. Chemical bonding was clearly evidenced by (a) change in solubility characteristics of the carbon and polymer, (b) by change in appearance of the product, (c) by change in the manner in which the carbon was retained in the polymer and (d) by the change in tensile strength above referred to.

In support of these observations there are noted below several tests conducted with samples of invention crumb made in accordance with the procedure of Example A and also with similar samples made in a conventional manner.

Test for change in appearance

A sample of the crumb product made in accordance with the procedure of Example A was placed on a lighted viewing surface side by side with a sample of crumb made by mixing carbon and polymer without high energy level pressurization and the two samples were carefully compared. A striking change in appearance was present in the invention sample as compared with the conventional sample. The invention sample exhibited a glossy surface whereas the conventional sample exhibited no glossy appearance at any point and occurred throughout with a dull black surface. The two samples while still supported on the lighted surface were thereafter torn apart and separated into small component pieces and again examined. Here also it was found that the invention sample retained a glossy appearance throughout the body portion whereas the conventional sample showed merely a dull black surface. It was concluded that these two examinations clearly indicated a chemically bonded association of carbon in the case of the invention crumb and lack of such bonding in the conventional crumb.

Test for change in carbon marking

A sample of the invention crumb was formed into a small mass and drawn across a sheet of white paper. Similarly, a sample of a conventional crumb in a small mass was drawn across the same sheet of paper. In the latter case a distinct line of carbon black was observed whereas with the invention crumb no line appeared at all. This indicated again that the carbon in the invention sample was retained in an entirely different manner necessitating bonded relationship of carbon to polymer while in the conventional sample carbon was not held in this manner.

Test for change in tensile strength

A sample of the invention crumb produced by the method described in Example A was provided. The sample weighed 1.5 pounds. This sample included 1 pound of rubber polymer, .5 pound of carbon black and .013 pound of antioxidant and a suitable vulcanizing agent. This sample of product was thereafter subjected to standard curing procedures using curing periods of 25, 50 and 100 minutes.

From the cured rubber sample there was then formed a number of strips of rubber which were tested with standard tensile strength measuring means to produce a series of tensile strength determinations which were plotted to form the tensile strength curve shown in FIGURE 5.

At the same time a conventional rubber sample was prepared utilizing a conventional masterbatch having the same quantities and materials noted above but mixed without the high energy processing steps of the invention, and cured, coagulated, and washed in the manner noted above. From this sample standard tensile strength strips were formed and subjected to the same tensile strength means to provide another set of values which were plotted to form the curve shown in FIGURE 5 at the right hand side of this figure.

As will be observed from an inspection of the two curves in FIGURE 5, a significant increase in tensile strength was obtained with the samples of the invention as compared with samples made from conventional procedures for incorporating carbon black in a latex polymer. It will also be observed from a comparison of the two curves in FIGURE 5 that the invention samples reached their peak tensile strength value in a much shorter cure time as compared with the conventional samples.

Test for change in solubility

Four rubber samples were subjected to tests by determining solubility in the solvent toluene. Sample No. 1 contained no carbon and was subjected to high pressure (8000 p.s.i.). Sample No. 2 contained carbon without high energy level pressure processing. Sample No. 3 contained carbon and was subjected to high level energy processing at 500 p.s.i. Sample No. 4 was prepared similarly to sample No. 3 but was processed at presures of 8000 p.s.i.

SAMPLE 1

In preparing Sample No. 1, one-half gallon of copolymer 1500 latex from Polymer Rubber Company of Baton Rouge, La. was passed through a high energy level pumping apparatus and subjected to pressures of 8000 p.s.i. and then discharged through an orifice into a one percent sulphuric acid solution with agitation. This produced a rubber crumb which was given two one-half hour washes in fresh water.

Thereafter, three grams of crumb sample were cut into extremely fine particles and allowed to swell in ten millilitres of toluene. After swelling was complete the volume was made up to 100 millilitres and allowed to stand overnight. The mixture was centrifuged for one hour and then 50 millilitres of supernatant liquid was poured with stirring into 100 millilitres of warm SD–30 alcohol. The clot formed was removed and redissolved in toluene, reprecipitated in alcohol, removed, pressed to eliminate solvent and dried to constant weight at 80° C. The resulting determination showed a percentage extraction of 0.0.

SAMPLE 2

Sample No. 2 was prepared by mixing eight parts by weight of Vulcan 3 carbon black and 92 parts water which was processed in a colloid mill at .010 inch gap setting. This mix was discharged from the colloid mill into an equal volume of copolymer 1500 latex with agitation. The resulting carbon black latex masterbatch was then coagulated with sulphuric acid (one percent solution) and washed and tested in the same manner as described with Sample No. 1 and showed a percentage extraction of 42.7.

SAMPLE 3

Sample No. 3 was made with the same materials and amounts specified in Sample No. 2 and the resulting masterbatch of carbon black and latex was then subjected to high energy level pressurizing at 500 p.s.i. before being coagulated with sulphuric acid. This sample when washed and tested for solubility in the manner described with reference to Samples No. 1 and No. 2 showed a percentage extraction of 56.0.

SAMPLE 4

Sample No. 4 was made in exactly the same manner as Sample No. 3 using the same materials and quantities by subjecting the masterbatch of carbon black and latex to high energy level processing pressures of 8000 p.s.i. The resulting product was then coagulated, washed and subjected to the same solubility test in toluene and showed a percentage extract of 65.3.

From the above extraction percentages it was apparent that a change in solubility of substantial nature had taken place which could only be accomplished by chemical bonding occurring in a significant degree. Since Sample No. 1 indicated no material extracted, it was to be concluded that the pressurizing copolymer 1500 was completely insoluble with no carbon present even at a pressure range of 8000 p.s.i. In Sample No. 2 some combination was present from mixing the carbon black and copolymer with agitation to a degree equal or greater than that known in the prior art.

In Samples No. 3 and No. 4 however, sharply increased solubilities were apparent and equally significant was the fact that the higher pressure level produced much greater solubility, i.e. 65.3% compared to 56.0%. These increased solubilities observed are consistent with rubber reinforcement comparable with or equal to that obtained with dry masterbatching.

Additional tests were also carried out corresponding generally to Example A wherein other polymers of varying molecular weights and carbon black having varying mean surface areas were premixed. In these tests varying pressures were employed and regulated in accordance with the variables noted within limits which avoided polymer degradation and yet provided rubber reinforcement in significantly increased degree comparable with that obtained by conventional dry masterbatching. One such test is noted below as Example B.

EXAMPLE B

Tensile strength curves were plotted as indicated diagrammatically in FIGURE 6, including a curve at the left hand side of FIGURE 6 indicating tensile strength resulting from masterbatching in accordance with the invention, and at the right hand side of FIGURE 6 a tensile strength curve obtained with conventional masterbatching as produced by a Banbury mixer or the like.

In plotting these curves a plurality of tensile strength testing strips were formed from rubber produced according to Example A, utilizing the same materials and quantities. At the same time testing strips of Banbury mixed rubber was provided for comparison purposes. These several test samples were then subjected to standard tensile strength testing means to provide a series of values which were plotted to form the two curves in FIGURE 6. It will be observed from an inspection of these two curves of FIGURE 6 that the bonded relationship of the carbon at the high energy pressure levels specified has resulted in a rubber reinforcement of a degree comparing almost exactly with that obtained from dry masterbatching using a Banbury mixer. Therefore, it may be concluded that a significant increase in the degree of bonding over any previously obtained bonding results has been made possible by the method of the invention and without loss of rubber reinforcement from excessive polymer degradation.

In addition to the above-mentioned advantages, it has also been observed that by proper selection of pressures and pH values of the carbon black, it is possible to coagulate fractionally the latex carbon black mixture as it is passed through the orifice. These coagulum fractions vary widely in physical properties. For example, the coagulum of one fraction may be hard and tough, whereas the coagulum of the other fraction is soft and elastic.

It will be observed that in the method illustrated in FIGURE 1, the pressurized material is illustrated as passing into the coagulating tank 20 where actual coagulation may be caused to take place. However, a novel feature of the invention method consists in the fact that coagulation may actually be induced by utilizing the high pressures above-noted and then discharging the processed material into a suitable container.

In FIGURE 2, I have illustrated diagrammatically a modified form of the invention. The parts noted therein have similar but primed numerals, corresponding to those of FIGURE 1. In this modification I have illustrated a method of expediting the coagulation process by forming a cream of the pressurized material. This is accomplished by supplying brine from a brine tank 22'. Latex and carbon black are mixed and pressurized in the manner already described. The resulting brine and pressurized fluid from the member 18' is then thoroughly mixed together and repeatedly creamed in a creaming tank 24, utilizing a mixer 26'. From the creaming tank 24' the product is transferred into a coagulating tank 28' for coagulating and washing the coagulated rubber crumb.

Figure 3:
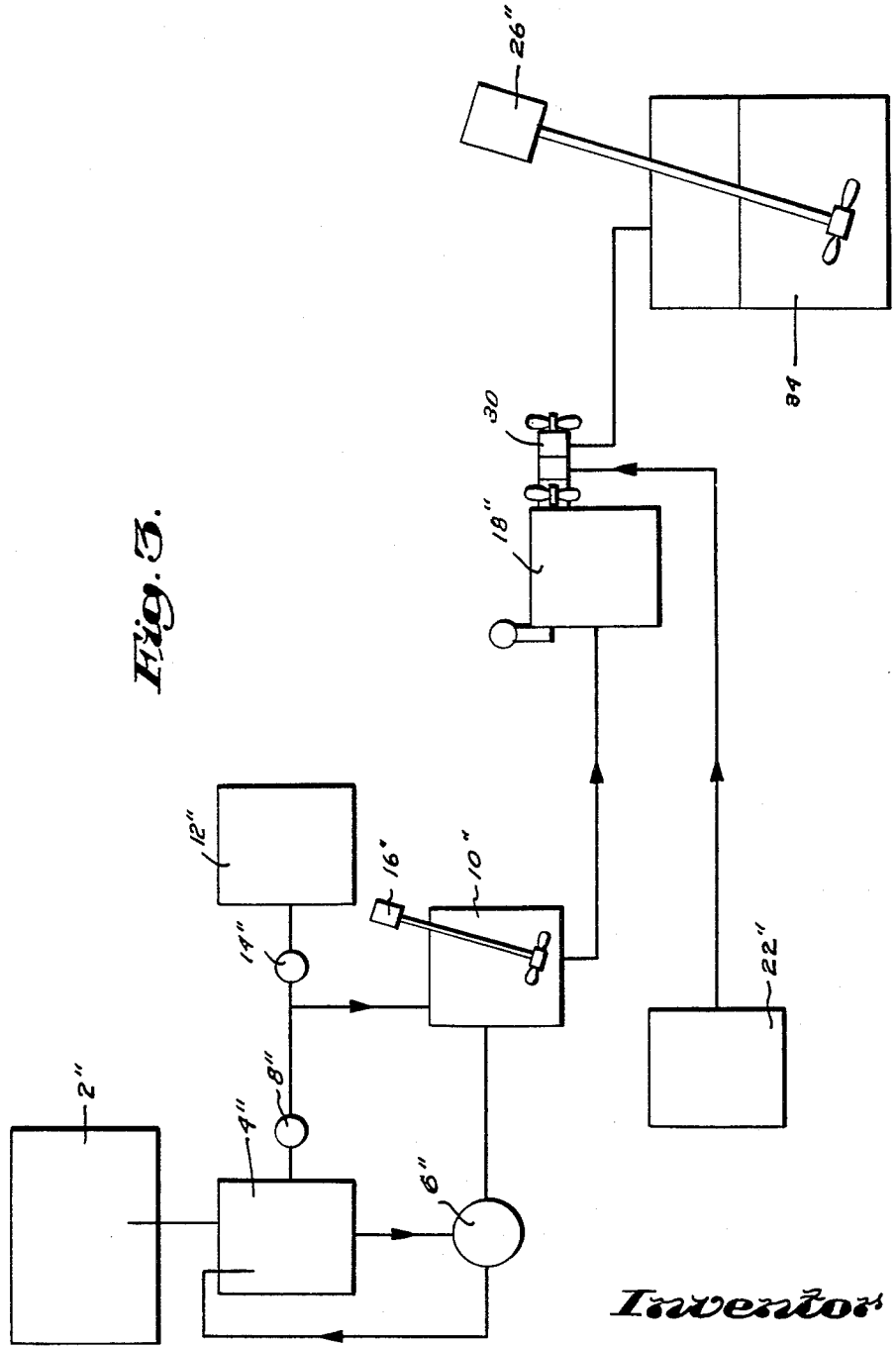

In FIGURE 3, I have shown another form of the invention in which the method of coagulating may be still further expedited in a desirable manner. I employ in this modified form of the invention apparatus similar to that described above including parts 2″, 4″, 6″, 8″, 10″, 12″, 14″, 16″, 18″, and 22″, also a second stage pressurizing device 30 which is adapted to exert pressures in a range of from 50 p.s.i. up to 1000 p.s.i. This device is located in series with the pressurizing device 18″. Brine from a brine tank 22″ is then introduced between the pressurizing devices 18″ and 30, as shown. I have found that this manner of processing latex carbon black product may result in almost instantaneous coagulation and that a control of the type and size of rubber crumb formed can be realized by regulating the pressures utilized at the second stage. The crumb is then processed in the usual way in a coagulating tank 34.

Figure 4:
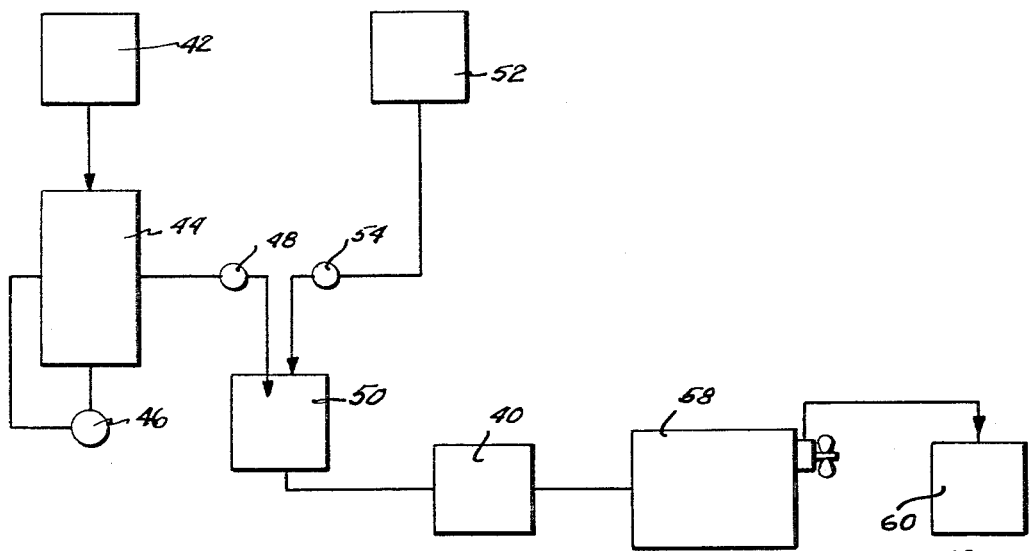
FIGURES 3 and 4 are diagrammatic views further illustrating other modified forms of the invention.

In FIGURE 4, I have illustrated another modified form of the invention in which apparatus as above described is employed including parts 42, 44, 46, 48, 50, 52, 54, 58 and 60 which are associated together, and between the members 50 and 58 I introduce a heating unit 40 by means of which temperature control may be realized.

From the foregoing disclosure it will be apparent that I have disclosed a method of processing carbon black and latex in which high energy level pressurizing is employed and controlled within limits which will avoid degradation of the particular latex polymer processed and which will furthermore achieve a degree of chemical bonding of significant extent. It is pointed out that desirable results may be obtained at varying selected pressure levels within varying controlled pressure levels within the range specified depending upon the degree of chemical bonding sought and the materials dealt with. With regard to variation in the components of the mix, it will further be seen that the pressure may be controlled or regulated in accordance with a number of variables such as change in the type or particle size of the carbon as well as the variation in the forms of latex or other elastomer processed, variation in curing technique and other considerations.

I may also desire to carry out the method of the invention in other modified forms as, for example, by employing other finely divided reinforcing agents and/or pigments either in place of carbon black, or in conjunction with it, including materials such as extender oils, accelerators, fillers, vulcanizers and the like.

Various other changes and modifications may also be practiced in keeping with the scope of the invention as defined by the appended claims.

I claim:

1. Method of producing a masterbatch of reinforced rubber or rubber-like material which comprises mixing together with agitation an aqueous dispersion of carbon black particles and a rubber latex to cause the carbon black to become dispersed throughout said rubber latex subjecting the premixed polymer dispersion and carbon black to a controlled pressure which approaches but does not exceed the point of polymer degradation and which is in a range of from 500 p.s.i. to 8000 p.s.i. causing carbon particles to further disperse, regulating the pressure in accordance with the molecular weight of the polymer, the mean surface area of the carbon particles and the proportion of carbon black to polymer used, and releasing pressure through an orifice to generate intense cavitational field forces and to combine substantial quantities of the finely divided carbon black particles with the pressurized polymer to provide for rubber reinforcement comparable with rubber reinforcement normally obtained by conventional dry mixing of carbon black and rubber polymer.

2. Method of producing a masterbatch of reinforced rubber or rubber-like material which comprises the mixing together with agitation an aqueous slurry of carbon black and an aqueous dispersion of a rubber polymer to cause the carbon black to become distributed throughout the liquid polymer instantaneously pressurizing the mixed polymer and carbon black by subjecting the mixture to a controlled pressure which approaches but does not exceed polymer degradation and which occurs in a range of from 500 p.s.i. to 8000 p.s.i. and simultaneously conducting the pressurized polymer and carbon black through an orifice instantaneously releasing pressure to induce intense cavitational forces, and then coagulating the resulting fluid mass to produce a rubber crumb having significantly changed solubility characteristics as compared with solubility characteristics of a dry masterbatch.

3. A method according to claim 2 in which the step of coagulating the fluid mass consists in adding a creaming agent thereto with agitation.

4. Method of producing masterbatches of rubber or rubber-like material which comprises the mixing together with agitation an aqueous slurry of carbon black and liquid latex body to cause the carbon black to become distributed throughout the liquid latex, instantaneously pressurizing the mixed latex body and carbon black by subjecting the mixture to pressures in a range of from 500 p.s.i. to 8000 p.s.i. and simultaneously conducting the pressurized latex and carbon black through an orifice, instantaneously releasing pressure to induce intense cavitational forces, mixing the combined latex and carbon with a brine liquid, subjecting the mixture of brine, carbon and latex to a second pressurizing step in a range of pressures of from 50 p.s.i. up to 1000 p.s.i. and then conducting the brine, latex and carbon black through an orifice and regulating the pressures exerted within the said 50 to 1000 p.s.i. range to control the degree of coagulation.

5. A method according to claim 2 in which the pressure and pH value of the finely divided material is controlled to provide coagulating fractions of differing chemical and physical properties.

References Cited
UNITED STATES PATENTS

| | | | |
|---|---|---|---|
| 2,980,639 | 4/1961 | Braendle | 260—41.5 |
| 2,986,547 | 5/1961 | Jefts et al. | 260—41.5 |
| 3,048,559 | 8/1962 | Heller et al. | 260—41.5 |

ALLAN LIEBERMAN, *Primary Examiner.*